Feb. 16, 1965　　　　S. A. MAXWELL　　　　3,169,669
BEVERAGE DISPENSING MACHINE
Filed July 16, 1963　　　　　　　　　　4 Sheets-Sheet 1

INVENTOR.
STEWART ALFRED MAXWELL
By Kurt Kelman
AGENT

Feb. 16, 1965    S. A. MAXWELL    3,169,669
BEVERAGE DISPENSING MACHINE
Filed July 16, 1963    4 Sheets-Sheet 2

INVENTOR.
STEWART ALFRED MAXWELL
By Kurt Kelman
AGENT

Feb. 16, 1965  S. A. MAXWELL  3,169,669
BEVERAGE DISPENSING MACHINE
Filed July 16, 1963  4 Sheets-Sheet 3

INVENTOR.
STEWART ALFRED MAXWELL
By Kurt Kelman
AGENT

Feb. 16, 1965      S. A. MAXWELL      3,169,669
BEVERAGE DISPENSING MACHINE
Filed July 16, 1963      4 Sheets-Sheet 4

INVENTOR.
STEWART ALFRED MAXWELL
By Kurt Kelman
AGENT

United States Patent Office 3,169,669
Patented Feb. 16, 1965

3,169,669
BEVERAGE DISPENSING MACHINE
Stewart Alfred Maxwell, Walsall, England, assignor to Fisher & Ludlow Limited, Birmingham, England, a British company
Filed July 16, 1963, Ser. No. 295,554
Claims priority, application Great Britain, July 19, 1962, 27,684/62
2 Claims. (Cl. 222—70)

This invention relates to beverage dispensing machines of the kind which include a liquid storage vessel the outlet of which contains a solenoid operated valve.

The valve is opened for a certain period of time to allow a quantity of liquid to flow through the outlet under the influence of gravity to a dispensing station to which a cup has previously been delivered. As the liquid level in the vessel falls upon repeated operation of the machine the pressure of liquid at the position of the valve will progressively decrease and hence the rate of flow of liquid through the valve will decrease. It is accordingly an object of the present invention to provide a beverage dispensing machine which includes improved switch means for opening the valve for three periods of time, the period of opening being progressively increased as the quantity of liquid in the vessel is decreased.

The machine may include a cup holder containing three stacks of cups, a central stack in a delivery compartment from which cups are removed by a cup dispenser and a further two stacks of cups in storage compartments supported on pivotable platforms disposed on either side of the central stack, the two platforms being pivoted successively so as to transfer their cups into the delivery compartment when the uppermost cup in the delivery compartment reaches a predetermined level.

It is a further object of the invention to provide a beverage dispensing machine in which the means for increasing the period of time for which the valve in the outlet of the liquid storage vessel is increased when a stack of cups in one of the storage compartments is transferred into the delivery compartment.

One embodiment of a liquid delivery system as applied to a beverage dispensing machine will now be described by way of example with reference to the accompanying drawings in which.

As shown the beverage dispensing machine includes a storage vessel 10 mounted in the top half of the body of the machine. The vessel 10 has a capacity of about 12 gallons being 22" long 15" wide and 10" deep. The vessel is normally refilled after about 11 gallons have been delivered. The vessel may contain, for example, a soft drink and in order to maintain the contents in a good palatable condition the vessel is normally refrigerated.

Figure 4:
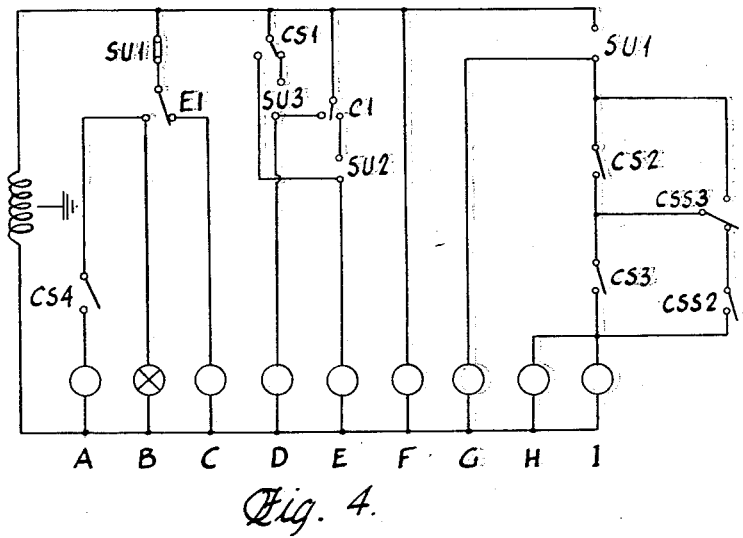
FIGURE 4 is a circuit diagram for controlling the solenoid operated valve for dispensing liquid from the storage tank.

A solenoid operated valve is mounted in the base of the vessel, the valve being opened by the energisation of the solenoid (represented as I in FIGURE 4). The solenoid is connected to the electrical supply in series with two cam operated switches CS2 and CS3. The cams are rotated by an electric motor. The time required for a vending operation, i.e. the time between the initiation of the machine and the final switching off of the electrical apparatus is about 6 seconds. The first of the cam operated switches CS2 is closed for about 2½ seconds during the cycle and the second switch CS3 closes about ½ a second after the first closes and remains closed for about 3 seconds. The timing sequence is shown in FIGURE 5.

The machine has a hinged front door 11 on the inside of which is mounted a cupholder 12, adapted to contain a central column of nested cups from which the cups are removed by a cup dispenser 13. Two other columns of nested cups are supported on platforms 14, one on either side of the central column; the left hand side platform is adapted to tilt downwardly the first time the central column empties to transfer its cups to the central column and the right hand side platform is adapted to tilt when the central column again empties. The cup dispenser 13 drops the lower cup of the central column in the cup holder 12 into a delivery station 15 accessible from the front of the door 11. A pipe 16 leads from the outlet of the solenoid operated valve to the delivery station 15 so that after a cup has been dropped to the station 15 in response to insertion of coinage into the machine via the coin inlet 17 and the coin selector mechanism 18 the beverage will be delivered by the valve into the cup. The three columns in the cup holder 12 each contain 80 cups when full and the output of the machine is 240 cups containing an average of 6½ fluid ounces per cup, after which the cup holder and the beverage tank should be refilled.

Figure 1:
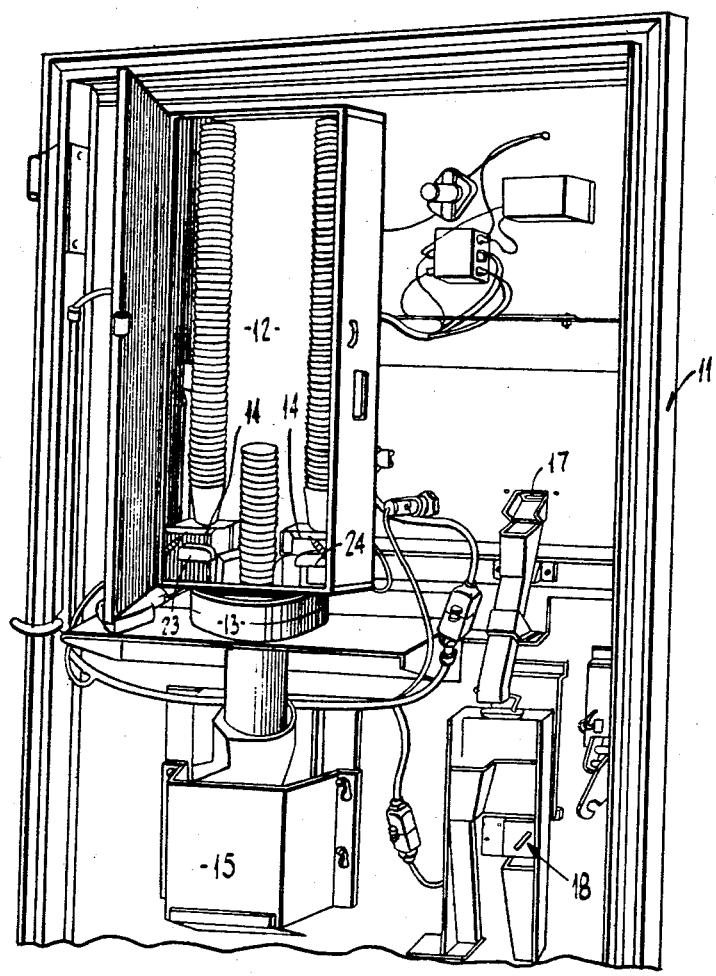
FIGURE 1 is a perspective view of the top half of the door of a beverage dispensing machine.
Figure 2:
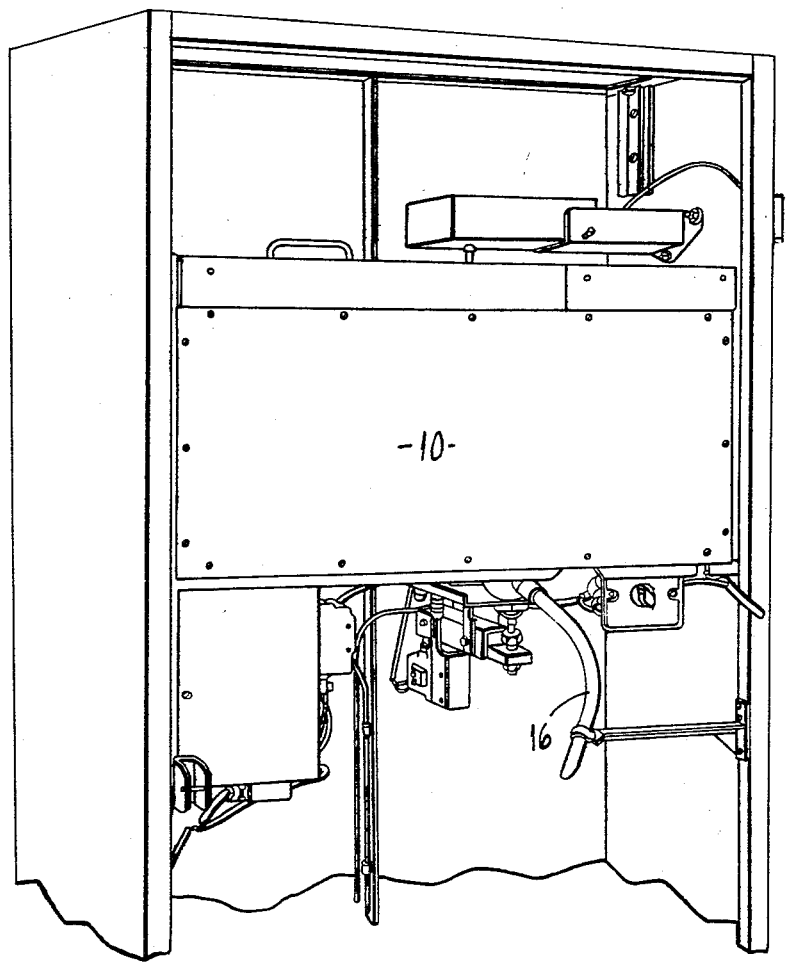
FIGURE 2 is a perspective view of the top half of the body of a beverage dispensing machine.
Figure 3:
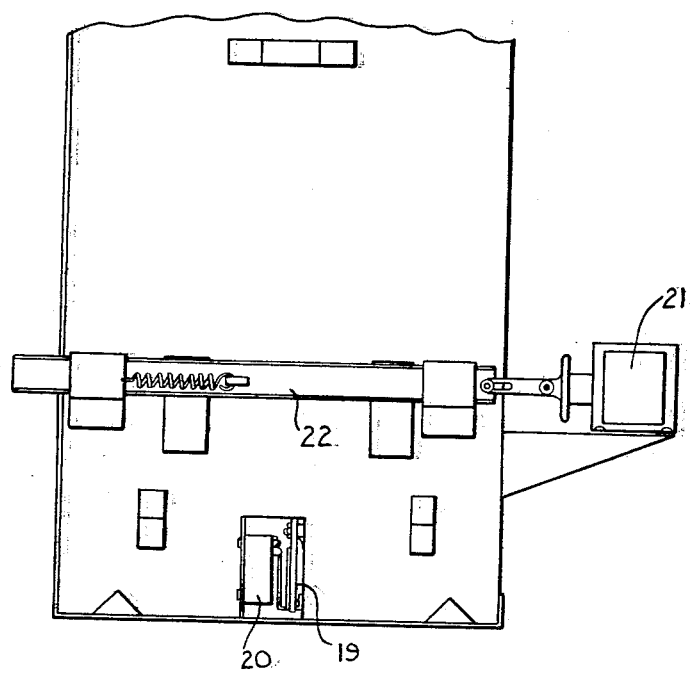
FIGURE 3 is a rear view of the cabinet containing the cups showing the mechanism for tilting the cup supporting platforms.

A V-shaped striker 19 projects through a slot in the back of the cup holder, this striker is normally held against pivotal movement by engagement with the cups in the central column. When, however, the central column of cups is depleted the striker is free to pivot and operate a microswitch 20 which actuates a solenoid 21 which causes an actuator bar 22 to move to the right as seen in FIGURE 3. The first operation of the solenoid 21 causes the left-hand side platform of FIGURE 1 to tilt downwardly, the second operation of the solenoid causes the right hand side platform of FIGURE 2 to tilt downwardly and the third operation of the solenoid causes the machine to be rendered inoperative and lights a sold out lamp indicated at B in FIGURE 4.

Figure 5:
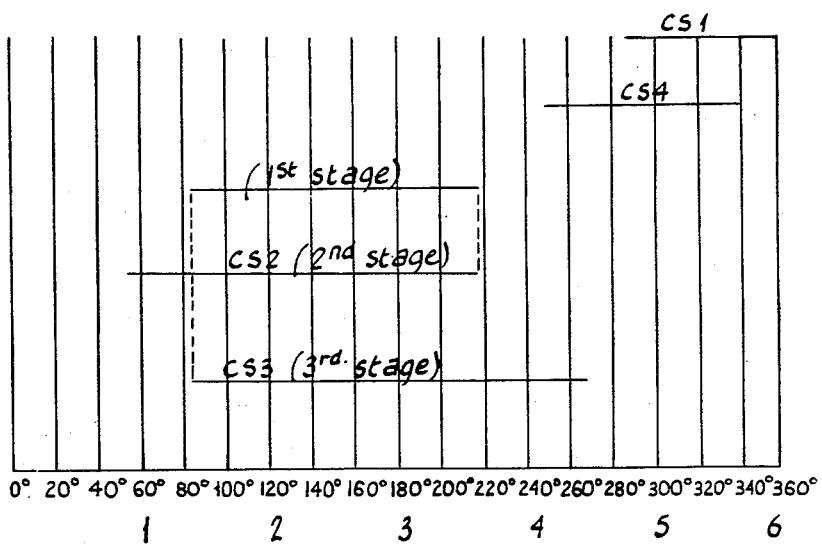
FIGURE 5 is a cam timing diagram.

Mounted beneath the platforms 14 in the cupholder are microswitches 23 and 24, shown as CSS2 and CSS3 in FIGURE 5. Microswitch 23, CSS2 is mounted below the left hand side platform of FIGURE 1 and microswitch 24, CSS3 is mounted below the right hand side platform. Switch 24, CSS3 is a change-over switch, the common contact of which is wired between the two cam-operated switches CS2 and CS3 in series with the valve solenoid I. One of the two other contacts of switch 24, CSS3 is wired between switch CS3 and the current supply line whilst the remaining contact is wired to one contact of switch 23, CSS2 which is a simple on-off switch and of which the other contact is connected between the solenoid I and switch CS2.

Before the central column of cups has emptied microswitch 23, CSS2 is open and is connected through microswitch 24, CSS3 to the connection between the two cam switches CS2 and CS3. Neither of the two cam switches CS2 and CS3 is by-passed and when the machine is operated the valve solenoid I will be energised for the period of time for which the two cam switches are closed, i.e. 2 seconds (First Stage). When the central column of cups has emptied after about one third of the liquid in the tank 10 has been dispensed the left-hand side platform of FIGURE 1 will tilt to transfer its cups to the centre and microswitch 23, CSS2 will be closed. The cam switch CS3 will thus be by-passed so that when the machine is now operated solenoid I will be energised for the whole time for which cam switch CS2 is closed, i.e. 2½ seconds. This will have the effect of increasing the quantity of liquid dispensed, which gradually falls during depletion of the central column from about 7 fluid ounces to 6 fluid ounces to 7 fluid ounces again.

When the central column is again emptied it will be refilled by the tilting of the other platform, which will operate microswitch 24, CSS3 to by-pass cam switch CS2, and simultaneously break the connection to microswitch 23, CSS2. When the machine is now operated, the solenoid I will thus be energised, and the valve opened, for 3 seconds which will again increase the quantity of liquid dispensed.

Referring now to the remainder of the circuit shown in FIGURE 4, C1 is a coin switch operated upon insertion of a coin into the machine, actuation of which causes a relay D to be energised and operate switches SU1, SU2 and SU3. CS4 is a switch (shown as 20 in FIGURE 3) operated by striker 19 to operate solenoid 21 (shown at A in FIGURE 4) which causes a platform to be tilted. On the third actuation of switch CS4 (i.e. when the cup holder is empty) switch E1 is operated which lights a sold out lamp B, and operates a blocking relay C to prevent insertion of further coinage. E represents the timer motor for the cam switches CS2 and CS3 which is controlled by switch CS1. F represents an agitator motor for stirring the liquid in tank 10. G represents the solenoid in the cup dispenser 13 which causes a cup to be taken from the bottom of the central column of cups to the delivery station 15, and H represents a counter for counting the total number of cups dispensed and the amount of coinage inserted.

What I claim then is:

1. In a beverage dispensing machine which includes a cabinet, a liquid storage vessel having an outlet disposed within said cabinet, a solenoid operated valve in said outlet and a switch means for energising the solenoid of said valve for three periods of time; a maximum period, an intermediate period and a minimum period, and in which the period of time for which the solenoid is energised and the valve is opened is progressively increased as the quantity of liquid in the storage vessel is decreased the improvement in that said switch means includes first and second cam switches in series with the solenoid, the first cam switch being closed for a period of time equal to said maximum period, the second cam switch being closed for a period of time equal to said intermediate period and the periods of closing of the cam switches overlapping for a period equal to said minimum period, a first normally open by-pass switch in parallel with the second cam switch, means for closing said first by-pass switch so as to by-pass the first cam switch for opening the valve for said intermediate period and means for closing said second by-pass switch so as to by-pass the second cam switch for opening the valve for said maximum period and the two by-pass switches, when open ensuring that the current supply to the solenoid of the valve passes through the first and second cam switches to open the valve for the minimum period of time.

2. A beverage dispensing machine which includes a cabinet, a liquid storage vessel having an outlet disposed within said cabinet, a solenoid operated valve in said outlet, a cup holder including a delivery compartment and a pair of storage compartments, a pivotable platform in each storage compartment, a stack of nested cups in the delivery compartment and on each pivotable platform, means for pivoting each of said platform so as to transfer the stack of cups supported thereby into the delivery compartment when the uppermost cup in the delivery compartment reaches a predetermined level, switch means for energising the solenoid of said valve for three periods of time, a maximum period, an intermediate period and a minimum period, said switch means including first and second cam switches in series with the solenoid, the first cam switch being closed for a period of time equal to said maximum period, the second cam switch being closed for a period of time equal to said intermediate period and the periods of closing of the two switches overlapping for a period equal to said minimum period, a timer motor for controlling the closing and opening of said first and second cam switches, coin operated means for actuating said motor, a first normally open by-pass switch in parallel with the first cam switch, a second normally open by-pass switch in parallel with the second cam switch, means for closing said first by-pass switch so as to by-pass the first cam switch so as to open the valve for said intermediate period as a result of actuation of said motor and pivotal movement of one of said platforms and means for closing said second by-pass switch so as to by-pass the second cam switch to open the valve for said maximum period as a result of actuation of said motor and pivotal movement of the other platform, the two by-pass switches when open ensuring that the current supply to the solenoid passes through said first and second cam switches to open the valve for said minimum period upon actuation of said motor.

References Cited by the Examiner
UNITED STATES PATENTS

| | | | |
|---|---|---|---|
| 2,872,075 | 2/59 | Steiner | 222—70 |
| 2,949,137 | 8/60 | Arnett et al. | 222—76 X |
| 3,055,552 | 9/62 | Emmons | 222—70 |

LOUIS J. DEMBO, *Primary Examiner.*

HADD S. LANE, *Examiner.*